May 12, 1959           B. J. SIMMONS           2,885,923

REFLECTION REFRACTOMETER

Filed Aug. 13, 1954                         2 Sheets-Sheet 1

*INVENTOR.*
B. J. SIMMONS

BY *Hudson & Young*

ATTORNEYS

May 12, 1959 B. J. SIMMONS 2,885,923
REFLECTION REFRACTOMETER
Filed Aug. 13, 1954 2 Sheets-Sheet 2

INVENTOR.
B. J. SIMMONS
BY Hudson & Young
ATTORNEYS

# United States Patent Office 2,885,923
Patented May 12, 1959

2,885,923

REFLECTION REFRACTOMETER

Bill J. Simmons, Long Beach, Calif., assignor to Phillips Petroleum Company, a corporation of Delaware Application August 13, 1954, Serial No. 449,644

8 Claims. (Cl. 88—14)

This invention relates to a reflection refractometer. In another aspect it relates to a method of compensating a refractometer for temperature changes.

In recent years a large number of industrial processes have been controlled in an automatic manner by removing a sample stream from a preselected region of the process and analyzing the stream to determine the composition thereof. In response to this analysis a selected process variable is adjusted to retain the composition of the sample stream at a desired value. One particular system of analysis that has been used makes use of a measurement of the refractive index of the sample stream. By comparing the refractive index of such a sample stream with a second reference material, any variance in the measured difference indicates that the sample stream has changed in composition from the desired value. A suitable process variable can be adjusted in response to this measurement to restore the desired operating condition.

In accordance with the present invention there is provided an improved reflection refractometer which can be employed to measure in a continuous manner the refractive index of a sample stream. This measurement is made by comparing the refractive index of the sample stream with the refractive index of a reference material which is selected to have a refractive index greater than the refractive index of the sample. The two materials are disposed adjacent one another and a beam of radiation is reflected from a rotatable mirror through the reference material to strike the interface between the two materials at approximately the critical angle. The reflected beam is directed to a radiation detector which is connected electrically in opposition to a second radiation detector which is energized by the source of reference radiation. If the refractive index of the sample stream changes, it is necessary to direct the incident beam of radiation at a different angle to retain the reflected beam on the detector. The output signal from the two detectors drives a servo motor to rotate the mirror until the radiation of the reflected beam on the detector is of the same magnitude as was the original beam. In a preferred embodiment of this invention the beam reflected from the interface between the two materials is reflected from the rotatable mirror before impinging upon the radiation detector. This refractometer is particularly useful for measuring the refractive index of opaque fluids because the beam of radiation is not directed through the sample fluid, but rather is reflected from the surface thereof.

In measuring the refractive index of a sample stream in comparison with the refractive index of a reference material, it is important to establish close temperature control because the refractive index of fluids varies appreciably with temperature changes. In a differential refractometer, for example, this temperature control can be established by maintaining the sample fluid and the reference material at the same temperature through the use of suitable heat exchange means. If the reference material is a fluid which has a composition approximating the composition of the sample fluid, then like changes in temperature of the two fluids change the refractive indices of both by the same amount and the comparison is unaffected. In a reflection refractometer, however, the reference fluid must have a greater index of refraction than does the test fluid and as such must be of different composition. While some degree of control can be maintained by conventional thermostating, such a procedure is not entirely satisfactory when extremely accurate results are desired.

In accordance with this invention there is provided a system of compensating a refractometer cell for temperature variations by blending a reference fluid of two or more constituents so that the composite refractive index change as a function of temperature is the same as the corresponding change of the sample fluid being measured.

Accordingly, it is an object of this invention to provide improved apparatus for measuring the refractive index of a fluid.

Another object is to provide a reflection refractometer wherein the incident beam of radiation is directed toward the interface between two materials under measurement at substantially the critical angle.

Another object is to provide a refractometer cell for use with a reflection refractometer wherein the refractive index of a sample fluid is compared with the refractive index of a reference fluid.

A still further object is to provide a method of compensating refractometers for temperature variations.

Other objects, advantages and features of this invention should become apparent from the following detailed description taken in conjunction with the accompanying drawing in which.

Figure 1:
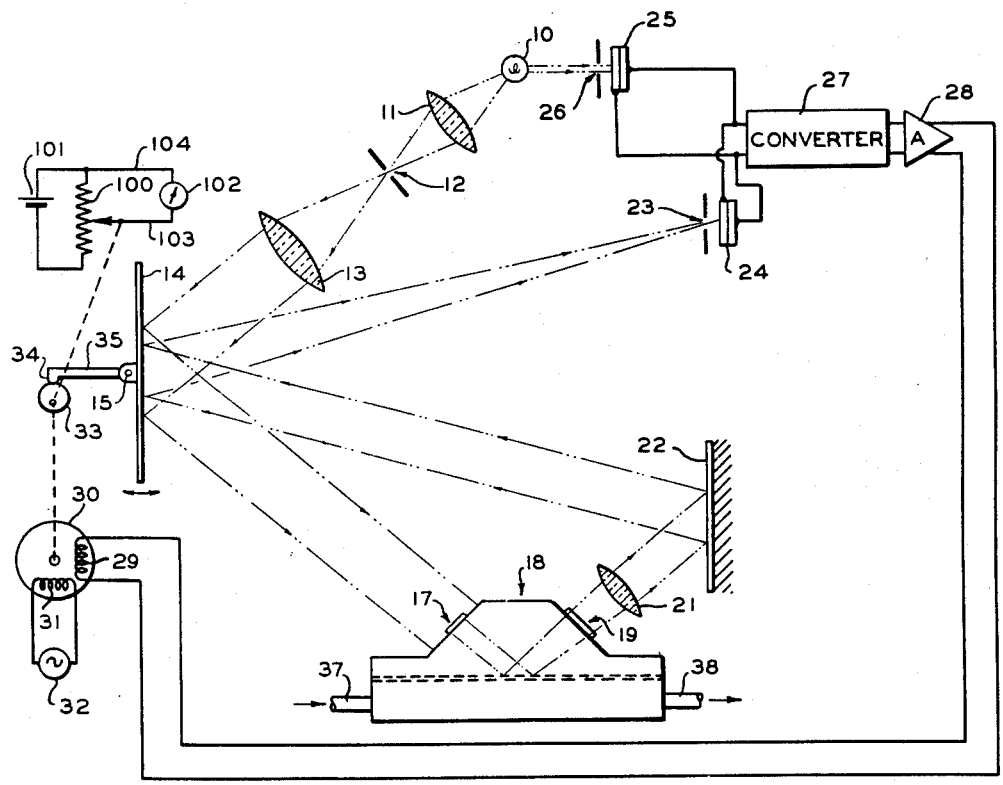
Figure 1 is a schematic representation of the optical and electrical system of the refractometer of this invention.

Referring now to the drawing in detail and to Figure 1 in particular, there is shown a source of radiation 10 which can provide light in the visible spectrum, for example. Monochromatic light can be employed for increased accuracy but generally is not essential. Radiation from source 10 is converged by a first lens 11 at a slit 12. Slit 12 is positioned in the focal plane of a collimating lens 13 so that parallel beams of radiation are directed from lens 13 to a plane mirror 14 which is adapted to be rotated about an axis 15. The radiation incident upon mirror 14 from lens 13 is reflected to pass through an inlet 17 of a refractometer cell assembly 18. The radiation is reflected within assembly 18 and emerges through an outlet 19. The emerging beam from assembly 18 passes through a converging lens 21 and strikes a fixed plane mirror 22. The beam of radiation reflected from mirror 22 is once again reflected from mirror 14 and passes through an adjustable slit 23 to impinge upon a radiation detector 24, which can be a photovoltaic cell. A second beam of radiation is directed from source 10 through an adjustable slit 26 to impinge upon a second similar radiation detector 25.

Detectors 24 and 25 are connected in electrical opposition, and the net voltage therefrom is applied to the input terminals of a converter circuit 27 which provides an output alternating signal of magnitude proportional to the magnitude of the direct voltage signal from the two detectors. The output signal from converter 27 is amplified by an amplifier 28 and applied to the first winding 29 of a reversible servo motor 30. The second winding 31 of motor 30 is energized from a source of alternating current 32. The two voltages applied to motor 30 are 90° out of phase. The drive shaft of motor 30 is mechanically coupled to a cam 33 which is in engagement with a cam follower 34. Cam follower 34 is connected by an arm 35 to mirror 14 such that rotation of motor 30 results in mirror 14 being rotated about axis 15.

Figure 2:
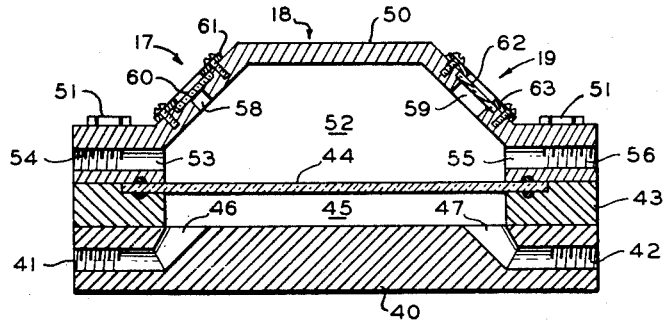
Figure 2 is a sectional view of the refractometer cell employed in Figure 1.

The sample fluid stream to be analyzed is directed into the lower portion of refractometer cell assembly 18 through an inlet conduit 37 and is vented through an outlet conduit 38. Assembly 18 is illustrated in detail in Figure 2 as comprising a lower plate 40 which is provided with an inlet opening 41 to receive conduit 37. Plate 40 also has an outlet opening 42 which receives conduit 38. A second plate 43 is attached to the top of plate 40, and a glass plate 44 is fitted across the top of plate 43. The center portion of plate 43 is hollow to define a chamber 45 which communicates with opening 41 in plate 40 through a passage 46 and with opening 42 through a passage 47. The sample stream to be analyzed is thus circulated through chamber 45 continuously. An upper plate 50 is mounted on the top of plate 43, and the three plates are held in assembled position by a plurality of screws 51. The interior of plate 50 is hollow to provide a chamber 52. Chamber 52 communicates through a passage 53 with an inlet opening 54 in plate 50 and through a passage 55 with an outlet opening 56 in plate 50. In this manner a second fluid can be circulated through chamber 52, if desired, or openings 54 and 56 can be plugged to retain a reference fluid stationary within chamber 52. The opposite side walls of plate 50 are provided with respective openings 58 and 59. Opening 58 is covered with a plate of radiation transparent material 60 which is retained in place by a mounting ring 61. Opening 59 is similarly covered with a transparent plate 62 which is retained in place by a mounting ring 63. Plates 60 and 62 thus form light openings 17 and 19, respectively. The side walls of plate 50 are of such angle that the incident radiation beam reflected from mirror 14 is substantially perpendicular to the plane of plate 60 and the beam of radiation emerging from assembly 18 is substantially perpendicular to the plane of plate 62. It is desired that plates 40, 43 and 50 be formed of materials having good heat conducting properties so that the fluids in chambers 45 and 52 remain at substantially the same temperature. Thermostating means can be employed for this purpose if desired.

Figure 3:
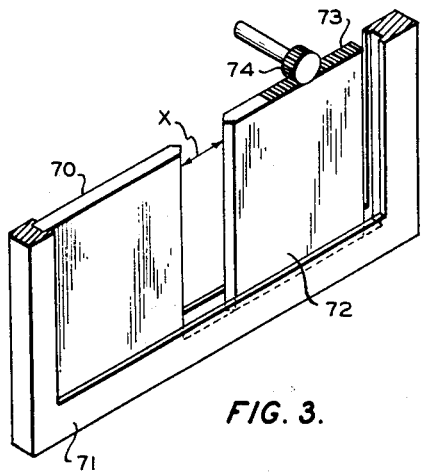
Figure 3 is a perspective view of an adjustable slit which can be employed in Figure 1.

In Figure 3 there is shown an adjustable slit arrangement which can be employed as either slit 23 or slit 26 in Figure 1. A first opaque plate 70 is mounted in a frame 71 and a second opaque plate 72 is slidably mounted in frame 71 such that the distance $x$ between the two plates can be varied. One edge of plate 72 is provided with a rack 73 which is engaged by a rotatable pinion 74. Rotation of pinion 74 varies the spacing between plates 70 and 72 to adjust the amount of radiation transmitted therethrough.

Figure 5:
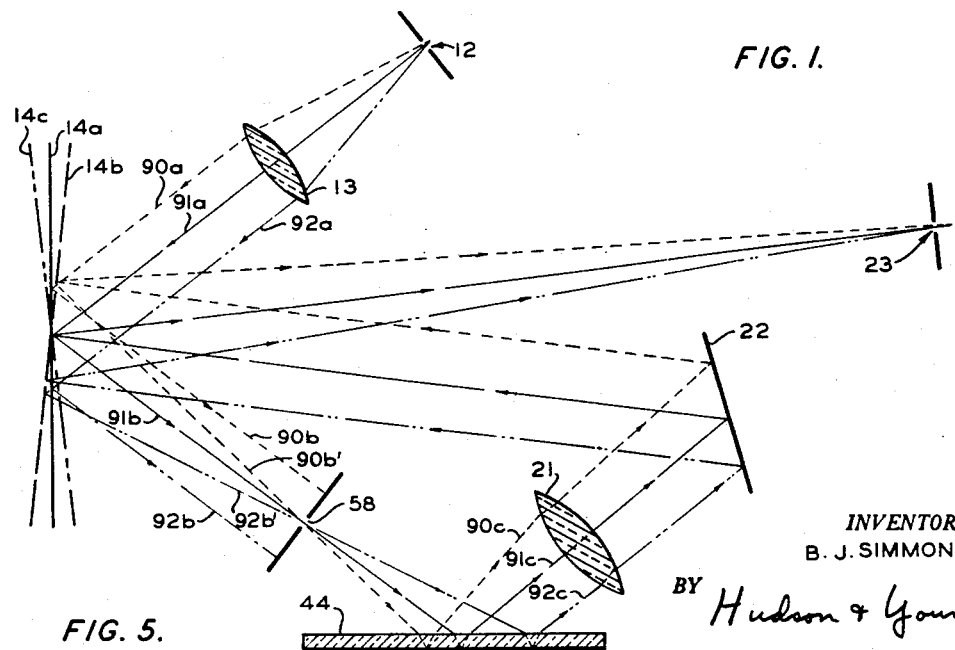
Figure 5 is a schematic optical diagram of the operation of the reflection system of the refractometer of Figure 1.
Figure 4:
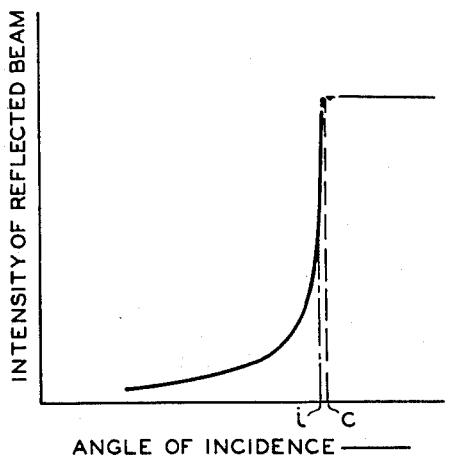
Figure 4 is a graphical representation of the intensity of the reflected beam as a function of the angle of incidence in the refractometer of this invention.
Figure 6:
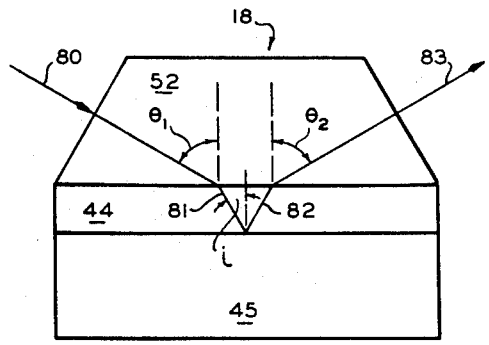
Figure 6 illustrates a feature of the temperature compensating aspect of this invention.

The operation of the reflection refractometer thus far described can be explained in conjunction with Figures 4, 5 and 6. With reference to Figure 6, an incident beam of radiation 80 entering cell assembly 18 is refracted at the interface between chamber 52 and plate 44 and continues as beam 81. Plate 44 is enlarged for purposes of illustration. A portion of beam 81 is reflected from the interface between plate 44 and chamber 45 and returns as beam 82. This beam is again refracted at the interface between plate 44 and chamber 52 to emerge from the cell assembly as beam 83. The refractometer is designed such that the angle of incidence $i$ of beam 81 is at approximately the critical angle. Normally, $i$ is a small fraction of one degree less than the critical angle. The graph in Figure 4 shows the intensity of a reflected beam of radiation which passes through a first material to strike the interface between the first material and a second material, the refractive index of the first material being greater than the refractive index of the second material. At angles greater than the critical angle the beam is entirely reflected. At angles less than the critical angle a portion of the beam is reflected while the remainder of the beam is refracted. As can be seen in Figure 4, the intensity of the reflected beam falls off rapidly at angles slightly less than the critical angle. This refractometer is operated such that incident beam 81 strikes the interface between plate 44 and chamber 45 at an angle $i$ which is only slightly less than the critical angle $c$. At approximately angle $i$ the intensity of the reflected beam changes rapidly with a change in the angle of incidence. If the refractive index of the fluid in chamber 45 should change, then the critical angle with respect to beam 81 also changes. The system is balanced initially such that the radiation impinging upon detector 24 is equal to the radiation impinging upon detector 25 when the fluid in chamber 45 has a predetermined refractive index. Adjustable slits 23 and 26 provide this initial balance. Under this condition, beam 81 has an incident angle $i$ and the net output voltage from detectors 24 and 25 is zero so that motor 30 remains stationary. If the refractive index of fluid in chamber 45 should change, then the intensity of the reflected beam 83 is changed so that the photocell outputs are unequal. A voltage is thus applied to converter 27 and amplifier 28 which drives motor 30 to rotate mirror 14 about axis 15.

The balancing feature of this invention is illustrated schematically in Figure 5. For purposes of description, three separate parallel beams 90a, 91a and 92a from lens 13 are illustrated. Initially mirror 14 occupies the position illustrated at 14a. Beams 90a, 91a and 92a are reflected from mirror 14a as respective beams 90b, 91b and 92b. Central beam 91b passes through opening 58 in plate 50 to impinge upon glass plate 44 after passage through the fluid in chamber 52. However, reflected beams 90b and 92b do not pass through opening 58. Beam 91b enters plate 44, is reflected from the lower surface thereof, and emerges from the upper surface of plate 44 as beam 91c. This beam is then focused by lens 21 so as to be directed through slit 23 after reflection from mirror 22 and mirror 14, the latter occupying position 14a. While a single ray path has been drawn to represent beam 90a, it should be evident that this beam actually represents a bundle of rays which are transmitted through opening 58.

If the refractive index of the fluid in chamber 45 should increase, assuming the refractive index of the fluid in chamber 52 remains constant, the intensity of beam 90c on detector 24 is changed because of the resulting change in critical angle. This causes motor 30 to rotate so that mirror 14 occupies the position illustrated at 14c. At this new position beam 91b is rotated upwardly (not shown) and no longer passes through opening 58. However, beam 92b is deviated to the position illustrated by beam 92b' so as to pass through opening 58 to impinge upon plate 44 at a greater angle of incidence. Beam 92b' is reflected from cell assembly 18 as beam 92c. This beam 92c diverges from original beam 91c. However, since mirror 14 now occupies the position illustrated at 14c, beam 92c is focused by lens 21 to pass through slit 23 and thereby impinge upon detector 24. The rotation of mirror 14 is continued until the radiation impinging upon detector 24 is the same as the radiation impinging upon detector 25, at which time rotation of motor 30 is terminated.

If the refractive index of the fluid in chamber 45 should decrease, motor 30 is rotated in the opposite direction until mirror 14 occupies the position illustrated by 14b. At this position, reflected beam 90b becomes beam 90b' which is transmitted through opening 58. The corresponding reflected beam 90c is likewise focused on slit 23 by lens 21 because of the new position of mirror 14.

In this manner, mirror 14 is rotated by motor 30 whenever there is a change in the refractive index of the fluid in chamber 45. The beam initially reflected by mirror 14 always enters the cell assembly at an angle which maintains a predetermined relationship with respect to the critical angle of the beam reflected from the interface between plate 44 and the fluid in chamber 45. The optical system is thus balanced continuously so that the radiation received by detectors 24 and 25 remains equal. This provides a null balance system which is extremely accurate because differences in magnitude of radiation can be measured with more accuracy than the magnitude of a single beam alone. The rotation of motor 30 is thus a measure of the refractive index of the fluid in chamber 45. This rotation can be measured by a suitable pointer, not shown, coupled to the drive shaft or by an electrical telemetering circuit. Such a circuit can comprise a potentiometer 100 having its end terminals connected across a voltage source 101. The contactor and one end terminal of potentiometer are connected to a meter 102 by respective leads 103 and 104. The contactor of potentiometer 100 is also mechanically coupled to the drive shaft of motor 30 so that meter 102 indicates the position of the drive shaft of motor 30.

As previously discussed, it is important that the refractive index of the fluid in chamber 52 change with temperature in the same manner as does the refractive index of the fluid in chamber 45. The change of refractive index with temperature of plate 44 can be neglected for practical purposes. With reference to Figure 6, $\theta_1$ is equal to $\theta_2$ and must be constant for given fluid compositions despite like temperature changes in the two fluids if temperature compensation is to be accomplished. That is:

$$\frac{d \sin \theta_1}{dT} = 0 \quad (1)$$

With reference to Figure 6, $$\frac{\sin \theta_1}{\sin i} = \frac{\mu_s}{\mu_1} \quad (2)$$

and $$\sin i = \frac{\mu_2}{\mu_s} \quad (3)$$

where $i$ is approximately the critical angle, $\mu_s$ is the index of refraction of plate 44, $\mu_1$ is the index of refraction of the fluid in chamber 52 and $\mu_2$ is the index of refraction of the fluid in chamber 45. By combining Equations 3 and 4, there is obtained:

$$\sin \theta_1 = \sin i \left(\frac{\mu_s}{\mu_1}\right) = \frac{\mu_2}{\mu_s} \cdot \frac{\mu_s}{\mu_1} = \frac{\mu_2}{\mu_1} \quad (4)$$

By substituting Equation 4 in Equation 1 and differentiating, there is obtained:

$$\frac{d \sin \theta_1}{dT} = 0 = -\frac{\mu_2}{\mu_1^2} \cdot \frac{d\mu_1}{dT} + \frac{1}{\mu_1} \cdot \frac{d\mu_2}{dT} \quad (5)$$

Equation 5 can be rewritten:

$$\frac{\frac{d\mu_1}{dT}}{\mu_1} = \frac{\frac{d\mu_2}{dT}}{\mu_2} \quad (6)$$

The sample fluid can be formed, for example, of two liquids A and B in respective proportions $\alpha$ and $\beta$. Obviously, $$\alpha + \beta = 1 \quad (7)$$

If $\mu_A$ and $\mu_B$ are the respective refractive indices of liquids A and B, then:

$$\alpha \mu_A + \beta \mu_B = \mu_1 \quad (8)$$

Equation 8 can be differentiated with respect to T as follows:

$$\alpha \frac{d\mu_A}{dT} + \beta \frac{d\mu_B}{dT} = \frac{d\mu_1}{dT} \quad (9)$$

Substituting Equations 6 and 8 in Equation 9 gives:

$$\alpha \frac{d\mu_A}{dT} + \beta \frac{d\mu_B}{dT} = \frac{\mu_1}{\mu_2} \cdot \frac{d\mu_2}{dT} = \frac{\alpha\mu_A + \beta\mu_B}{\mu_2} \cdot \frac{d\mu_2}{dT} \quad (10)$$

Since $\beta = 1 - \alpha$, $$\alpha \frac{d\mu_A}{dT} + (1-\alpha) \frac{d\mu_B}{dT} = \frac{\alpha \mu_A}{\mu_2} \cdot \frac{d\mu_2}{dT} + (1-\alpha) \frac{\mu_B}{\mu_2} \cdot \frac{d\mu_2}{dT} \quad (11)$$

or $$\alpha = \frac{\frac{\mu_B}{\mu_2} \cdot \frac{d\mu_2}{dT} - \frac{d\mu_B}{dT}}{\frac{d\mu_A}{dT} - \frac{d\mu_B}{dT} - \frac{\mu_A}{\mu_2} \cdot \frac{d\mu_2}{dT} + \frac{\mu_B}{\mu_2} \cdot \frac{d\mu_2}{dT}} \quad (12)$$

As a specific example, let it be assumed that normal hexane is to be analyzed in chamber 45. Normal hexane has a refractive index of 1.37486 at 20° C. and 1.37226 at 25° C., both at standard pressure. Thus:

$$\frac{d\mu_2}{dT} = \frac{-0.00260}{5} = -0.00052$$

The reference fluid in chamber 52 can be a mixture of ethylcyclopentane (A) and benzene (B). Ethylcyclopentane has a refractive index of 1.41981 at 20° C. and 1.41730 at 25° C., both at standard pressure. Thus:

$$\frac{d\mu_A}{dT} = \frac{-0.00251}{5} = -0.00050$$

Benzene has a refractive index of 1.50112 at 20° C. and 1.49792 at 25° C., both at standard pressure. Thus:

$$\frac{d\mu_B}{dT} = \frac{-0.00320}{5} = -0.00064$$

It should be noted that components A and B are chosen so that $$\frac{d\mu_A}{dT}$$

is of lesser absolute magnitude than $$\frac{d\mu_2}{dT}$$

while $$\frac{d\mu_B}{dT}$$

is of greater absolute magnitude than $$\frac{d\mu_2}{dT}$$

Substitution of these values in Equation 12 gives:

$$\alpha = \frac{\frac{1.50112}{1.37486} \cdot (-.00052) - (-0.00064)}{-0.00050 - (-0.00064) - \frac{1.41981}{1.37486} \cdot (-0.00052) + \frac{1.50112}{1.37486} \cdot (-0.00052)}$$

$\alpha = 0.66$
$\beta = 1 - \alpha = 0.34$

Thus, the reference fluid is formed of 66% by volume of ethylcyclopentane and 34% benzene.

From the foregoing description it can be seen that there is provided in accordance with this invention an improved reflection refractometer wherein a beam of radiation is directed through a first material to the interface with a second material at approximately the critical angle. The reflected beam is compared with a reference beam of radiation and the angle of incidence is adjusted until a predetermined relationship exists between the two beams. Temperature compensation is provided by a novel method of blending a reference fluid. While the

What is claimed is:

1. A refractometer comprising, in combination, means defining a chamber adapted to receive a fluid to be measured, means holding a material having a refractive index greater than the refractive index of the fluid to be measured in optical contact with said fluid, a source of radiation, first and second radiation detectors, means to direct a first beam of radiation from said source through said material to strike the interface between said material and the fluid to be measured at approximately the critical angle, means to direct radiation reflected from said interface to said first detector, means to direct a second beam of radiation from said source to said second detector, means to compare the radiation received by said first and second detectors, and balance means under control of said means to compare to vary the angle of incidence of said first beam of radiation at said interface in response to changes in the relative radiation received by said detectors due to changes in refractive index of the fluid to be measured until the radiation received by said two detectors is in a predetermined ratio.

2. The combination in accordance with claim 1 wherein said means to direct said first beam of radiation and said balance means comprise a rotatable reflector, said detectors comprise photovoltaic cells connected in opposition to provide a voltage proportional to the difference of radiation impinging upon said cells, a reversible motor energized by said voltage, and means connecting said motor to said reflector so that rotation of said motor rotates said reflector.

3. The combination in accordance with claim 1 wherein said means to direct said first beam of radiation into said chamber comprises a rotatable plane mirror, said first beam of radiation being reflected from said source by said mirror, said balance means is connected to said mirror to cause rotation thereof, and a fixed mirror positioned in the path of the reflected beam of radiation from said chamber to direct said reflected beam to said rotatable mirror and then to said first detector.

4. A refractometer comprising, in combination, means defining a chamber adapted to receive a fluid to be measured, means holding a material having a refractive index greater than the refractive index of the fluid to be measured in optical contact with said fluid, a source of radiation, first and second radiation detectors, a first converging lens to establish parallel rays of radiation from said source, a rotatable plane mirror positioned in the path of said parallel rays of radiation, said parallel rays of radiation being directed from said plane mirror through said material to strike the interface between said material and the fluid to be measured at approximately the critical angle, a second converging lens in the path of radiation reflected from said interface, a fixed plane mirror in the path of radiation reflected from said interface to direct said reflected radiation to said rotatable mirror and then to said first detector, means to direct a beam of radiation from said source to said second detector, means to compare the radiation received by said first and second detectors, and means under control of said last-mentioned means to rotate said rotatable mirror to vary the angle of incidence of said first rays of radiation at said interface in response to changes in the relative radiation received by said detectors due to changes in refractive index of the fluid to be measured until the radiation received by said two detectors is in a predetermined ratio.

5. A refractometer comprising, in combination, means defining a first chamber adapted to contain a fluid, means defining a second chamber adapted to contain a fluid, a radiation transparent plate separating said first and second chambers, a first radiation transparent member forming a radiation inlet in said second-mentioned means, said first member being positioned so that radiation transmitted therethrough into said second chamber can strike the interface between said plate and fluid in said first chamber at approximately the critical angle when said plate has a refractive index greater than the refractive index of fluid in said first chamber, a second radiation transparent member in said second-mentioned means through which reflected radiation can leave the interior of said cell, a source of radiation, first and second radiation detectors, means to direct a first beam of radiation from said source through said first member, means to direct the reflected radiation passed through said second member to said first detector, means to direct a second beam of radiation from said source to said second detector, means to compare the radiation received by said first and second detectors, and means under control of said last-mentioned means to vary the angle of incidence of said first beam of radiation at said interface in response to changes in the relative radiation received by said detectors due to changes in refractive index of the fluid to be measured until the radiation received by said two detectors is in a predetermined ratio.

6. The combination in accordance with claim 5 wherein said first chamber is provided with an inlet port and an outlet port so that a fluid to be tested can be circulated through said first chamber.

7. The combination in accordance with claim 5 wherein said first chamber is adapted to contain a first fluid to be measured which has a refractive index less than the refractive index of said plate, and said second chamber contains a second fluid which has a refractive index greater than the refractive index of said plate, said second fluid comprises a mixture of two fluid components A and B in respective proportions $\alpha$ and $\beta$ where $$\alpha = \frac{\frac{\mu_B}{\mu_2} \cdot \frac{d\mu_2}{dT} - \frac{d\mu_B}{dT}}{\frac{d\mu_A}{dT} - \frac{d\mu_B}{dT} - \frac{\mu_A}{\mu_2} \cdot \frac{d\mu_2}{dT} + \frac{\mu_B}{\mu_2} \cdot \frac{d\mu_2}{dT}}$$

and $$\beta = 1 - \alpha$$

where $\mu_B$ is the refractive index of said component B at a first temperature, $\mu_2$ is the refractive index of said first fluid at said first temperature, $$\frac{d\mu_2}{dT}$$

is the rate of change of refractive index of said first fluid with temperature $$\frac{d\mu_B}{dT}$$

is the rate of change of refractive index of said component B with temperature $$\frac{d\mu_A}{dT}$$

is the rate of change of refractive index of said component A with temperature, and $\mu_A$ is the refractive index of said component A at said first temperature.

8. A refractometer comprising, in combination, a first plate having a recess therein; a flat plate of radiation transparent material disposed across the side of said first plate having the recess therein so as to form a fluid chamber, said first plate having an inlet port and an outlet port communicating with said first chamber; a second plate having a recess therein, means positioning said second plate so that the recess therein forms a second chamber closed by said flat plate, opposite sides of said second plate having radiation transparent openings therein, said opposite sides making acute angles with said flat plate so that radiation transmitted through one of said openings is refracted at the interface between said second chamber and said flat plate, is reflected in part from the interface between said flat plate and said first chamber, is refracted at the interface between said flat plate and said second chamber, and emerges from said second chamber through the second opening; a source of radiation; first and second radiation detectors; a first converging lens to establish parallel rays of radiation from said source; a rotatable plane mirror positioned in the path of said parallel rays of radiation, said parallel rays of radiation being directed from said plane mirror through said one opening to strike the interface between said flat plate and fluid in said first chamber at approximately the critical angle, said flat plate having a refractive index greater than the refractive index of the fluid in said first chamber; a second converging lens in the path of radiation emerging from said second opening; a fixed plane mirror in the path of radiation emerging from said second opening to direct said radiation to said rotatable mirror and then to said first detector, means to direct a beam of radiation from said source to said second detector; means to compare the radiation received by said first and second detectors; and means under control of said last-mentioned means to rotate said rotatable mirror to vary the angle of incidence of said first rays of radiation entering said one opening in response to changes in the relative radiation received by said detectors due to changes in refractive index of the fluid to be measured until the radiation received by said two detectors is in a predetermined ratio.

References Cited in the file of this patent

UNITED STATES PATENTS

| | | |
|---|---|---|
| 1,794,222 | Whitney | Feb. 24, 1931 |
| 2,305,777 | Hansen et al. | Dec. 22, 1942 |
| 2,413,208 | Barnes | Dec. 24, 1946 |
| 2,427,996 | Seaman | Sept. 23, 1947 |
| 2,483,102 | Pierson | Sept. 27, 1949 |

FOREIGN PATENTS

| | | |
|---|---|---|
| 113,777 | Germany | Oct. 3, 1900 |
| 732,745 | Germany | Mar. 10, 1943 |
| 690,268 | Great Britain | Apr. 15, 1953 |

OTHER REFERENCES

"A Photoelectric Refractometer," Karrer et al., pages 42–46 in Journal of the Optical Society of America, volume 36, January 1946.